(12) United States Patent
Iwamura

(10) Patent No.: US 11,320,976 B2
(45) Date of Patent: May 3, 2022

(54) PROGRAM DEVELOPMENT SUPPORT DEVICE, PROGRAM DEVELOPMENT SUPPORT METHOD, AND NON-TRANSITORY COMPUTER-READABLE RECORDING MEDIUM

(71) Applicant: OMRON Corporation, Kyoto (JP)

(72) Inventor: Shintaro Iwamura, Otsu (JP)

(73) Assignee: OMRON Corporation, Kyoto (JP)

( * ) Notice: Subject to any disclaimer, the term of this patent is extended or adjusted under 35 U.S.C. 154(b) by 95 days.

(21) Appl. No.: 16/605,214

(22) PCT Filed: Feb. 28, 2018

(86) PCT No.: PCT/JP2018/007411
§ 371 (c)(1),
(2) Date: Oct. 15, 2019

(87) PCT Pub. No.: WO2018/220921
PCT Pub. Date: Dec. 6, 2018

(65) Prior Publication Data
US 2021/0141513 A1    May 13, 2021

(30) Foreign Application Priority Data
May 31, 2017  (JP) .............................. JP2017-107429

(51) Int. Cl.
*G06F 3/048*  (2013.01)
*G06F 3/04845*  (2022.01)
(Continued)

(52) U.S. Cl.
CPC ...... *G06F 3/04845* (2013.01); *G06F 3/04842* (2013.01); *G06F 3/0486* (2013.01)

(58) Field of Classification Search
CPC ............. G06F 3/04845; G06F 3/04842; G06F 3/0486; G06F 8/34; G06F 8/38; G05B 19/05
See application file for complete search history.

(56) References Cited

U.S. PATENT DOCUMENTS 7,603,183 B1 * 10/2009 Munemoto ............ G05B 19/05
                                                                700/17
8,694,959 B2 *  4/2014 Chouinard ................ G06F 8/33
                                                                717/110
(Continued)

FOREIGN PATENT DOCUMENTS

EP         2146259       5/2017
JP       2001075614      3/2001
(Continued)

OTHER PUBLICATIONS

"International Search Report (Form PCT/ISA/210) of PCT/JP2018/007411," dated May 29, 2018, with English translation thereof, pp. 1-3.

(Continued)

*Primary Examiner* — Mahelet Shiberou
(74) *Attorney, Agent, or Firm* — JCIPRNET

(57) ABSTRACT

In order to facilitate creation of a controller program and a UI program in which variables match each other, this program development support unit is provided with: a calculation unit and a program development support program which implement a sequence program editing unit, a UI editing unit, and a copy function unit; a display unit; and an operation input unit. The copy function unit detects selection, through the input operation unit, of an element of the sequence program and movement to an editing screen in a user interface program, and causes elements in the user interface program that correspond to elements in the sequence program to be reflected on the editing screen of the (Continued)

user interface program. The copy function unit detects the type of the sequence program being edited, and, depending on the type of sequence program, determines the type of elements of the user interface program.

8 Claims, 10 Drawing Sheets

(51) Int. Cl.
*G06F 3/04842* (2022.01)
*G06F 3/0486* (2013.01)

(56) References Cited

U.S. PATENT DOCUMENTS

| | | | | |
|---|---|---|---|---|
| 9,176,734 | B2* | 11/2015 | Tomita | G06F 40/177 |
| 10,719,643 | B2* | 7/2020 | Horikawa | G05B 19/05 |
| 2006/0089728 | A1* | 4/2006 | Maeda | G05B 19/056 |
| | | | | 700/18 |
| 2012/0084664 | A1* | 4/2012 | Torgerson | G06F 3/048 |
| | | | | 715/747 |
| 2015/0094829 | A1* | 4/2015 | Iwatsu | G06K 9/80 |
| | | | | 700/86 |
| 2015/0261872 | A1* | 9/2015 | Amano | G06F 3/04842 |
| | | | | 715/201 |

FOREIGN PATENT DOCUMENTS

| | | |
|---|---|---|
| JP | 2002-140107 | 5/2002 |
| JP | 2003-044105 | 2/2003 |
| JP | 2011-192088 | 9/2011 |

OTHER PUBLICATIONS

"Search Report of Europe Counterpart Application", dated Jan. 27, 2021, pp. 1-8.

* cited by examiner

| variable (type) | UI element | display example |
|---|---|---|
| BOOL type | bit lamp | ○ |
| integer type/ real type | data display (right alignment) | 123456 |
| STRING type | data display (left alignment) | ABCDEFG |
| structure type | shape corresponding to structure member | HIJ<br>9999 |

PROGRAM DEVELOPMENT SUPPORT DEVICE, PROGRAM DEVELOPMENT SUPPORT METHOD, AND NON-TRANSITORY COMPUTER-READABLE RECORDING MEDIUM

CROSS-REFERENCE TO RELATED APPLICATION

This application is a 371 application of the International PCT application serial no. PCT/JP2018/007411, filed on Feb. 28, 2018, which claims the priority benefit of Japan Patent Application No. 2017-107429, filed on May 31, 2017. The entirety of each of the abovementioned patent applications is hereby incorporated by reference herein and made a part of this specification.

BACKGROUND OF THE INVENTION

Technical Field

The present invention relates to a program development support technology for executing editing of a controller program and editing of a user interface screen (UI screen).

Related Art

Currently, many sequence control devices are put into practical use. An indicator equipped with a user interface is connected to this sequence control device. An operator performs setting on the sequence control device by an operation input to the indicator.

The sequence control device operates based on a sequence program which is a controller program, and the indicator operates based on a user interface program (UI program). The sequence program and the UI program are associated by global variables. Accordingly, settings, changes and the like in variables of the sequence control device can be implemented by operating the user interface screen of the indicator.

Conventionally, the sequence program and the UI program are created using individual editors. Accordingly, a programmer should separately record variables set by the sequence program and create the UI program based on the recorded variables. Therefore, it is not easy to make variables of the sequence program and variables of the UI program match correctly to create these programs.

In contrast, an editor device described in patent literature 1 (Japanese Patent Application Laid-Open No. 2002-140107) drags an element (ladder element) of a ladder program which is a type of sequence program and drops the element on a UI editing screen, and thereby sets an element of the UI program that corresponds to the ladder element.

SUMMARY

Problems to be Solved

However, in the editor device described in patent literature 1, the element can only correspond to the ladder program. In addition, the element and the like of the UI program cannot be set corresponding to detailed information for elements of the sequence program such as the data type of the variables and the like. Therefore, there is a limit on the improvement in ease of program creation.

Accordingly, an objective of the present invention is to provide a program development support technology for facilitating creation of a controller program and a UI program in which variables are mutually matched.

Means to Solve Problems

The program development support device of the present invention includes a controller program editing unit, a UI editing unit, a display unit, an operation input unit, and a copy function unit. The controller program editing unit performs an editing of the controller program or a setting of variables used in the controller program. The UI editing unit performs an editing of a user interface program. The display unit displays an editing screen of the controller program or a setting screen of the variables and an editing screen of the user interface program. The operation input unit receives an operation input of selection and movement of elements of the controller program displayed on the display unit or selection and movement of the variables. The copy function unit reflects, on the editing screen of the user interface program, elements of the user interface program that correspond to elements of the controller program or the variables moved to the editing screen of the user interface program. The copy function unit determines types of elements of the user interface program according to types of the controller program being edited. If the elements of the controller program or the variables are global variables and there is no element of the user interface program at a movement destination of the elements of the controller program or the variables, the copy function unit causes the elements of the user interface program to be newly displayed on the editing screen of the user interface program.

In this configuration, the elements of the user interface program are automatically set corresponding to the type and elements of the controller program or the variables. For example, in a case of a ladder program, the elements of the user interface program are automatically set corresponding to elements of the ladder program. In a case of an ST program, the elements of the user interface program are automatically set corresponding to elements of the ST program. In a case of a variable setting, the elements of the user interface program are automatically set corresponding to elements of the variable setting program.

In addition, in the program development support device, the copy function unit causes the elements of the user interface program to be newly displayed on the editing screen of the user interface program when there is no element of the user interface program at a movement destination of the elements of the controller program or the variables.

In this configuration, an element of the user interface program is automatically added corresponding to the types and elements of the controller program or the variables.

The program development support device of the present invention includes a controller program editing unit, a UI editing unit, a display unit, an operation input unit, and a copy function unit. The controller program editing unit performs an editing of the controller program or a setting of variables used in the controller program. The UI editing unit performs an editing of a user interface program. The display unit displays an editing screen of the controller program or a setting screen of the variables and an editing screen of the user interface program. The operation input unit receives an operation input of selection and movement of elements of the controller program displayed on the display unit or selection and movement of the variables. The copy function unit reflects, on the editing screen of the user interface program, elements of the user interface program that correspond to elements of the controller program or the variables moved to the editing screen of the user interface program. The copy function unit determines types of elements of the user interface program according to types of the controller program being edited. If the elements of the controller program or the variables are global variables and there is element of the user interface program and there is element of the user interface program at a movement destination of the elements of the controller program or the variables, the copy function unit updates the variable mapping.

In this configuration, variables of the elements of the user interface program are automatically updated.

Effect

According to the present invention, a controller program and a UI program in which variables are mutually matched can be easily created.

DESCRIPTION OF THE EMBODIMENTS

Figure 1:
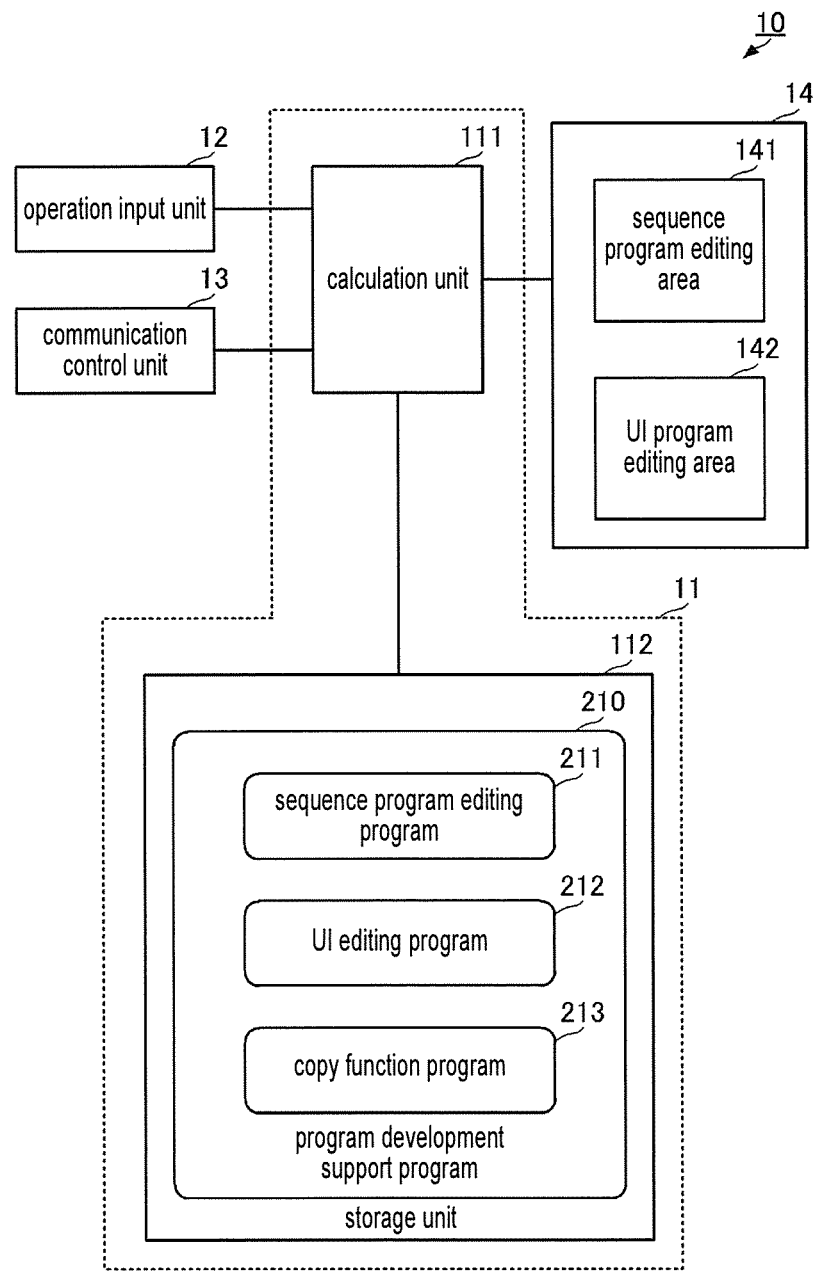
FIG. 1 is a schematic configuration diagram of an information processing device including a program development support device of an embodiment of the present invention.

A program development support technology of an embodiment of the present invention is described with reference to the drawings. FIG. 1 is a schematic configuration diagram of an information processing device including a program development support device of the embodiment of the present invention.

As shown in FIG. 1, an information processing device 10 includes a program development support unit 11, an operation input unit 12, a communication control unit 13, and a display unit 14. The information processing device 10 is implemented by a personal computer and the like. The operation input unit 12 is, for example, a mouse or a keyboard. The communication control unit 13 controls communication with a sequence control device. The display unit 14 is, for example, a liquid crystal display or the like, and displays at least one of a sequence program editing area 141, and a UI (user interface) program editing area 142 by processing described later. The sequence program editing area 141 and the UI program editing area 142 form a so-called window on a display screen, and positions and sizes of these areas on the display screen can be set by the operation input unit 12 to be capable of changing. The sequence program editing area 141 corresponds to "editing screen of controller program" of the present invention, and the UI program editing area 142 corresponds to "editing screen of user interface program" of the present invention.

The program development support unit 11 includes a calculation unit 111 and a storage unit 112. A program development support program 210 is stored in the storage unit 112. The program development support program 210 has a sequence program editing program 211, a UI editing program 212, and a copy function program 213.

The calculation unit 111 reads out the sequence program editing program 211 from the storage unit 112 and executes the sequence program editing program 211. In this way, the "controller editing unit" of the present application is implemented. The editing of the sequence program refers to editing of a program for setting operations of the sequence control device, that is, the sequence program which is a controller program, and editing of variables utilized in this program. The variables include global variables and local variables.

In the application, the sequence program may include a ladder program and a ST (Structure Text) program; preferably, the two types of programs are included.

The calculation unit 111 displays editing contents of the sequence program on the sequence program editing area 141 of the display unit 14.

The calculation unit 111 reads out the UI editing program 212 from the storage unit 112 and executes the UI editing program 212. In this way, the "UI editing unit" of the present application is implemented. The editing of UI refers to arrangement of an operation object or a display object, setting of the variables (global variables and local variables) for each object and the like in a display device (for example, a display device mounted on the sequence control device) capable of communicating with the sequence control device.

The calculation unit 111 displays editing contents of the UI on the UI program editing area 142 of the display unit 14.

The calculation unit 111 reads out the copy function program 213 from the storage unit 112 and executes the copy function program 213. In this way, the "copy function unit" of the present application is implemented. The copy function refers to addition of an object (element of the UI program) corresponding to the element of the sequence program and variable update that are performed by disposing the elements of the sequence program in the UI program editing area 142 by so-called drag and drop using the operation input unit 12. In addition, the copy function also includes update of the UI program editing area 142 performed by this process. At this time, the copy function program 213 performs automatic setting of the elements of the UI program using the elements of the sequence program corresponding to the type of the sequence program.

Figure 2:
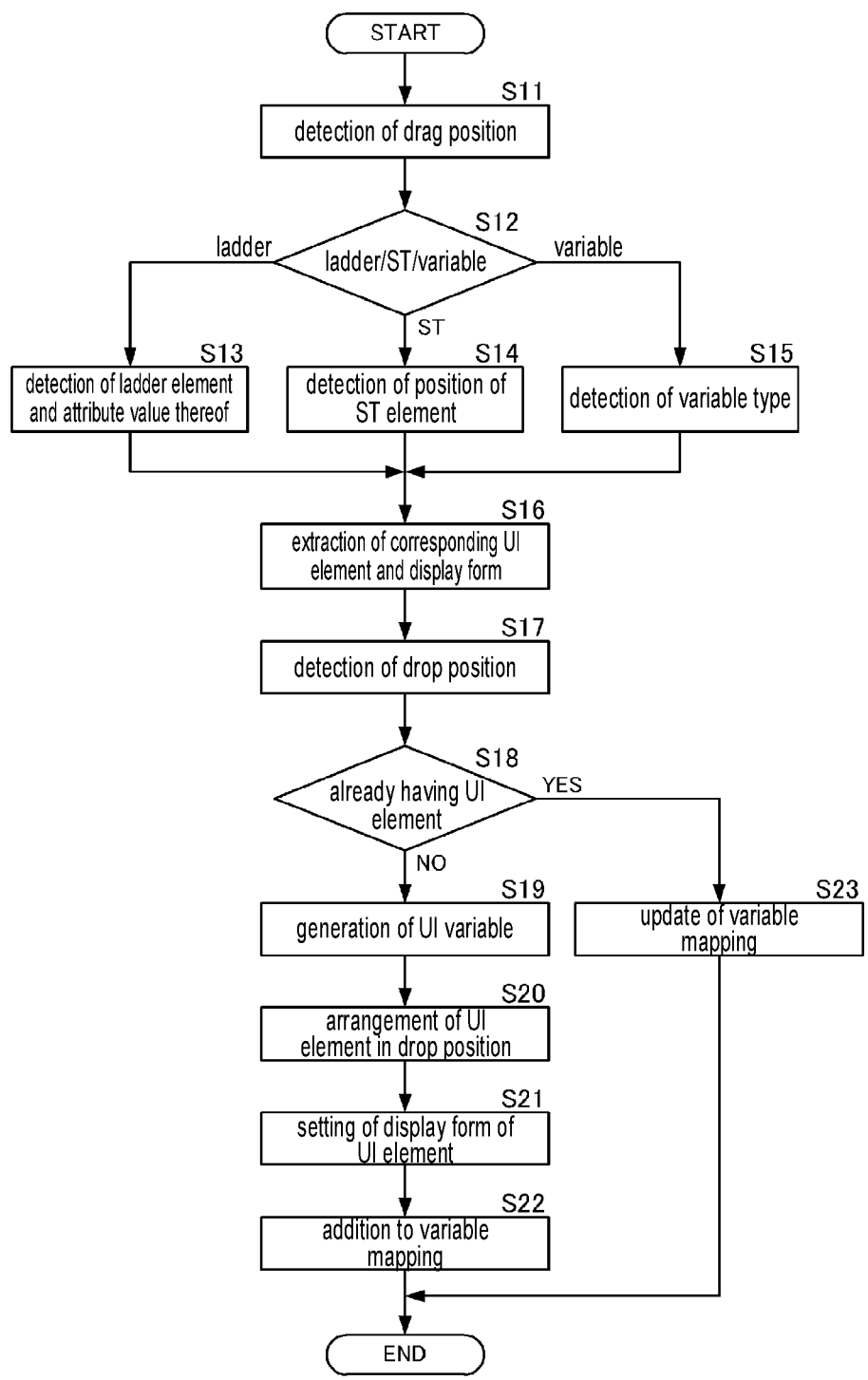
FIG. 2 is a flowchart showing a process of a program development support technology of the present invention.

Specifically, the program development support unit 11 executes the process shown in FIG. 2. FIG. 2 is a flowchart showing the process of a program development support technology of the present invention.

The program development support unit 11 detects a drag position based on an input of the operation input unit 12 (S11). Specifically, the program development support unit 11 detects, by the operation input unit 12, an active (currently selected) area within the sequence program editing area 141 and the UI program editing area 142 displayed on the display unit 14.

If the active area is the sequence program editing area 141, the program development support unit 11 detects an element of the sequence program selected in this area. On the other hand, if the active area is the UI program editing area 142, the program development support unit 11 detects an element of the UI program selected in this area. Besides, the process when the element of the UI program is detected is not shown in FIG. 2 but shown in FIG. 10, and the description is omitted here and mentioned later.

When the active area is the sequence program editing area 141, the program development support unit 11 executes the following process.

The program development support unit 11 detects the type of the sequence program. That is, the program development support unit 11 detects which one of the ladder program, the ST program, and the variable setting program is the sequence program being edited in the active area (S12).

In a case of the ladder program, the program development support unit 11 detects an element of the ladder program and a variable of the element (S13). Besides, the element of the ladder program selected here may be a contact point or coil, and the variable name displayed together with the contact point or coil may also be included in the element of the ladder program selected. In a case of the ST program, the program development support unit 11 detects an element of the ST program, a position of the element, and a variable of the element (S14). In a case of the variable setting program, the program development support unit 11 detects a variable being selected (S15). Besides, the program development support unit 11 also detects the data type of the variable when detecting the variable.

The program development support unit 11 stores an element of the UI program corresponding to each element of the sequence program (element of the UI program) and a display form corresponding to the data type of variable in the storage unit 112.

The program development support unit 11 extracts an element of the UI program corresponding to the selected element and a display form corresponding to the data type of variable (S16).

The program development support unit 11 detects a drop position based on input of the operation input unit 12 (S17). Specifically, the program development support unit 11 detects a position of the UI program editing area 142 that is specified by the operation input unit 12.

When the elements of the UI program are not disposed (S18: NO), the program development support unit 11 generates variables for the UI program (S19). The program development support unit 11 disposes the extracted element of the UI program in the drop position (S20). The program development support unit 11 sets the display form of the disposed element of the UI program (S21). The program development support unit 11 updates a variable mapping of the UI program corresponding to the added element of the UI program (S22).

At this time, the program development support unit 11 executes arrangement of the UI element and updates the variable mapping if the variables are global variables, that is, the variables are variables common in the sequence program and the UI program. On the other hand, the program development support unit 11 does not execute the arrangement of the UI element performed by a drop process if the variables are not global variables, that is, the variables are inherent variables of the sequence program.

On the other hand, when the element of the UI program is disposed (S18: YES), the program development support unit 11 updates the variable mapping of the UI program so as to change the variable of the element of the UI program that is already disposed in the drop position (S23).

At this time, the program development support unit 11 updates the variable mapping if the variables are global variables, that is, the variables are variables common in the sequence program and the UI program. On the other hand, the program development support unit 11 does not update the variable mapping if the variables are not global variables, that is, the variables are inherent variables of the sequence program.

By performing this process, the element of the UI program that corresponds to the element of the sequence program can be automatically set in a specified position of the UI screen no matter what type the sequence program is. At this time, if there is no element of the UI program in the specified position, an element of the UI program can be automatically added and the variable mapping can be automatically updated. On the other hand, if there is an element of the UI program in the specified position, the variable mapping can be automatically updated so as to change the variable of the element of the UI program. Accordingly, the programmer can create and edit the sequence program and the UI program while matching variables in these programs without performing complicate process.

More detailed specific examples for a case in which drag and drop from each sequence program to the UI program is performed are shown below.

Figure 3A:
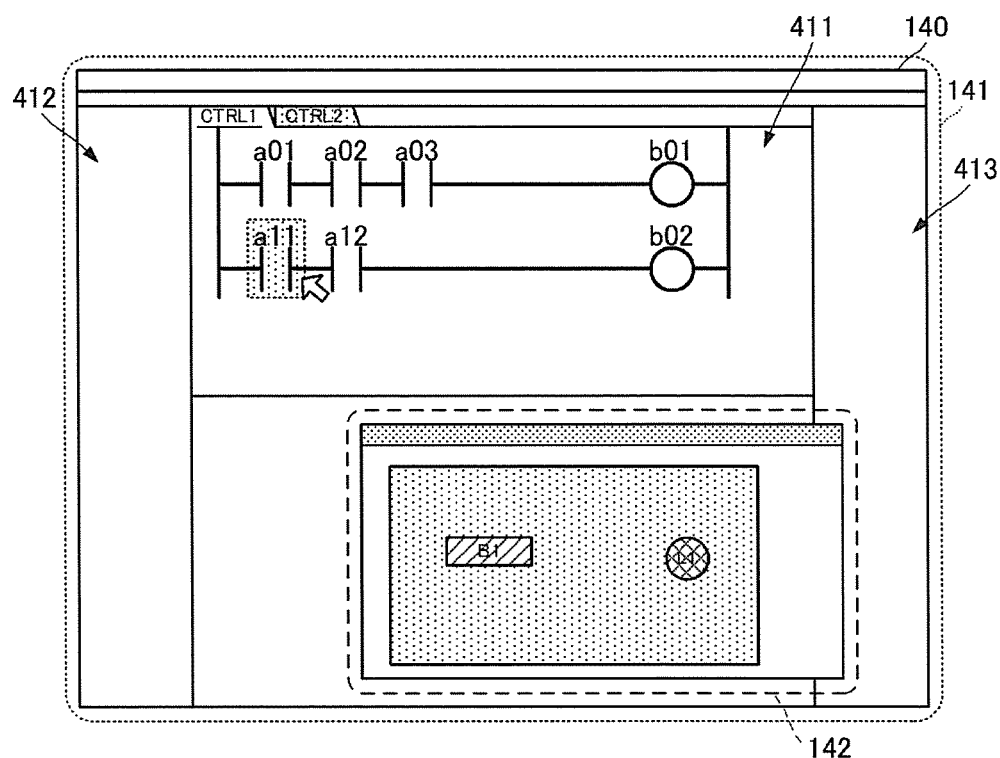
FIG. 3(A) is a screen diagram showing a drag state of a contact point of a ladder program, and FIG. 3 (B) is a screen diagram showing a drop state of the contact point of the ladder program.
Figure 3B:
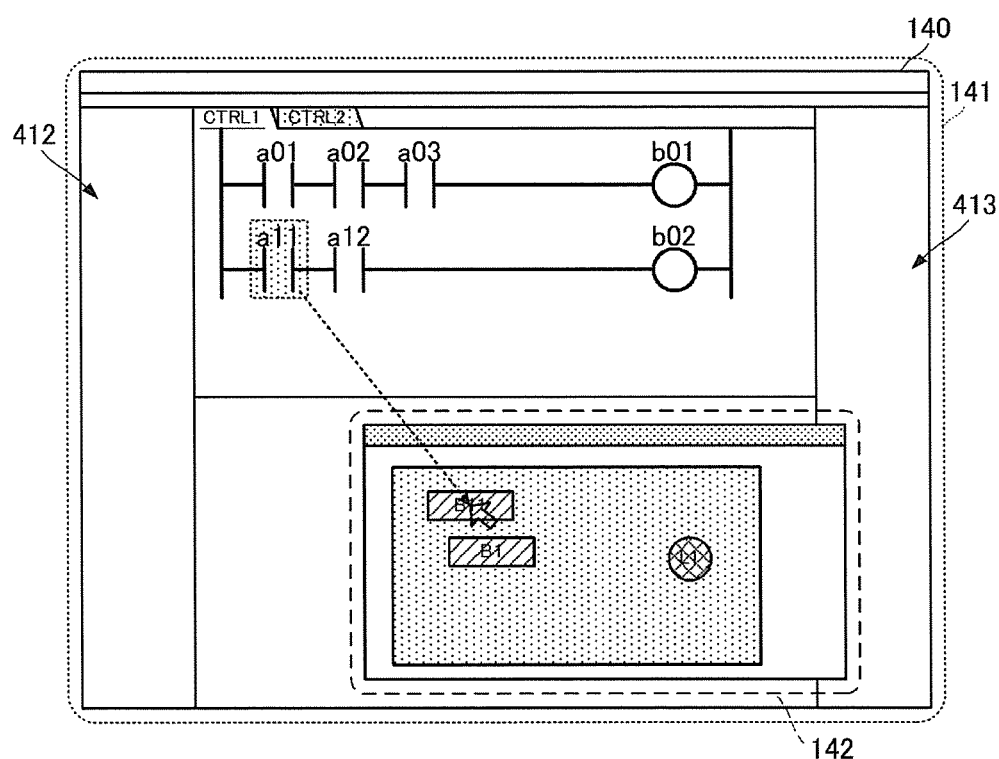
Figure 4A:
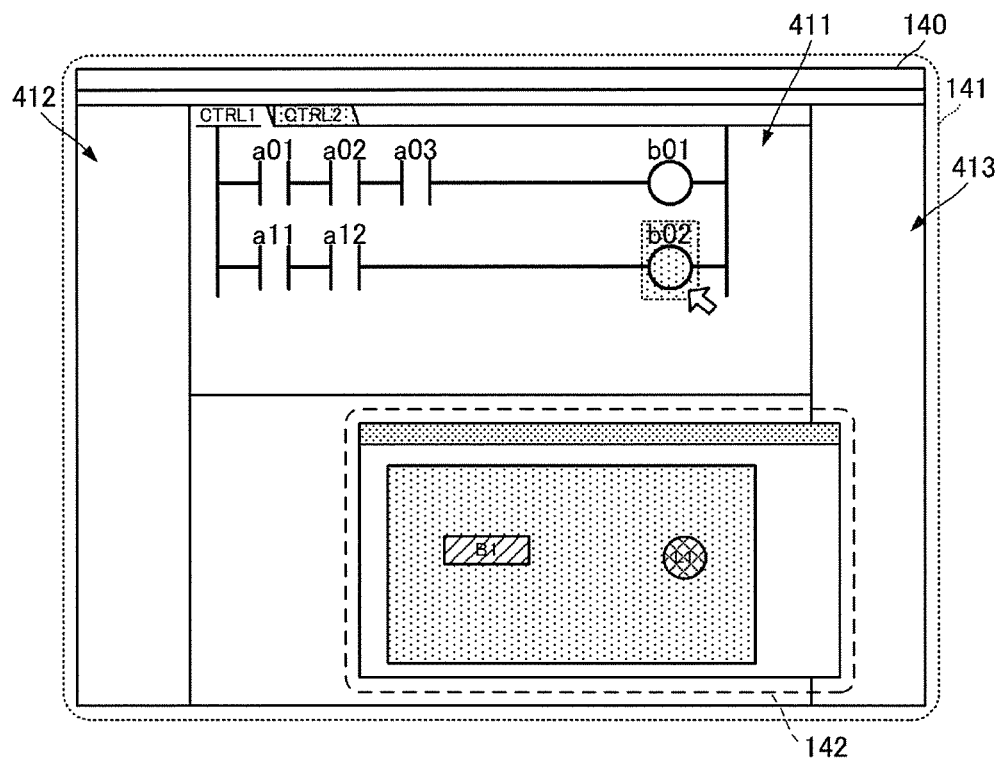
FIG. 4(A) is a screen diagram showing a drag state of a coil of the ladder program.
Figure 4B:
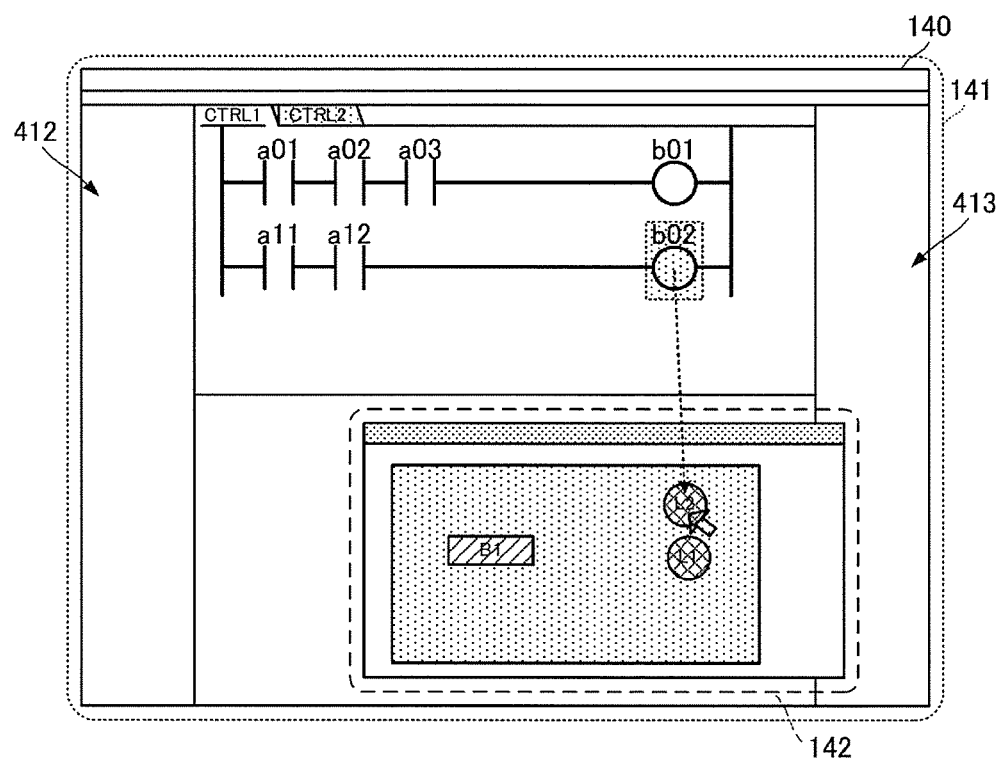
FIG. 4(B) is a screen diagram showing a drop state of the coil of the ladder program.

(Embodiment 1) Case of Adding an Element of the UI Program from the Ladder Program FIG. 3(A) is a screen diagram showing a drag state of a contact point of the ladder program, and FIG. 3(B) is a screen diagram showing a drop state of the contact point of the ladder program. FIG. 4(A) is a screen diagram showing a drag state of a coil of the ladder program, and FIG. 4(B) is a screen diagram showing a drop state of the coil of the ladder program.

As shown in FIG. 3(A), FIG. 3(B), FIG. 4(A), and FIG. 4(B), when editing of the ladder program and editing of the UI program are performed, at least a ladder program editing area (window) 411 and the UI program editing area (window) 142 are displayed on a display screen 140 of the display unit 14. In addition, a multiview explorer 412, an editing tool box 413 and the like are also displayed on the display screen 140.

A ladder diagram is displayed on the ladder program editing area 1410, and a UI screen is displayed on the UI program editing area 142.

When the programmer operates the operation input unit 12 such as a mouse or the like, a pointer moves on the display screen 140 in accordance with movement of the mouse. Then, when a display area of the element of the ladder program overlaps the pointer, a display mode of the display area of the element of the ladder program changes as shown in FIG. 3(A) and FIG. 4(A). When the programmer performs a drag operation in this state, the element of the ladder program is selected.

Next, when the programmer maintains the drag operation state and moves the mouse to the UI program editing area 142, the element of the UI program corresponding to the element of the ladder program is displayed on the UI program editing area 142 as shown in FIG. 3(B) and FIG. 4(B).

Specifically, the program development support unit 11 stores a relationship between the elements of the ladder program and the elements of the UI program in advance. As stored by the program development support unit 11, if the element of the ladder program is a contact point, the corresponding element of the UI program is a button; if the element of the ladder program is a coil, the corresponding element of the UI program is a bit lamp.

Accordingly, when the contact point is dragged in the ladder program editing area 411 and is dropped in the UI program editing area 142 as shown in FIG. 3(A), the button is disposed and displayed in a specified position of the UI program editing area 142 as shown in FIG. 3(B). At this time, an inherent index may be attached to and displayed on the button. The inherent index refers to a variable name or the like of the contact point corresponding to the button.

At this time, the variable of the corresponding contact point is set on the button. In addition, the button and the variable thereof are added to the variable mapping of the UI program.

In addition, when the coil is dragged in the ladder program editing area 411 and is dropped in the UI program editing area 142 as shown in FIG. 4(A), the bit lamp is disposed and displayed in a specified position of the UI program editing area 142 as shown in FIG. 4(B). At this time, an inherent index may be attached to and displayed on the bit lamp. The inherent index refers to a variable name or the like of the coil corresponding to the bit lamp.

At this time, the variable of the corresponding coil is set on the bit lamp. In addition, the bit lamp and the variable thereof are added to the variable mapping of the UI program.

Figure 5A:
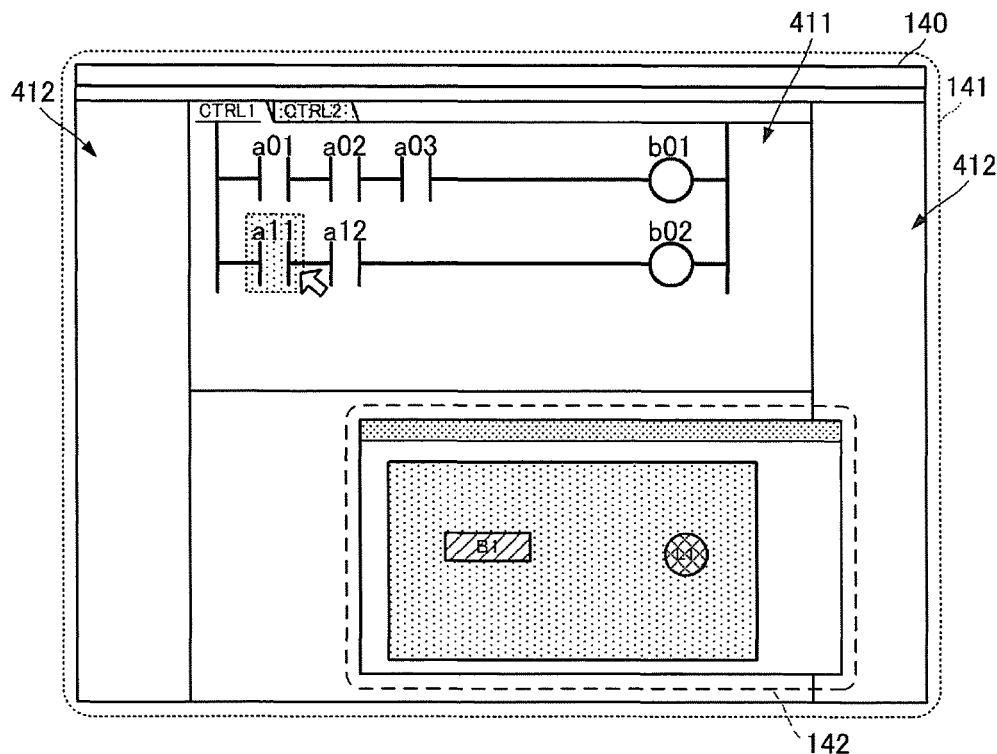
FIG. 5(A) is a screen diagram showing a drag state of a contact point of the ladder program, and FIG. 5 (B) is a screen diagram showing a drop state of the contact point of the ladder program.
Figure 5B:
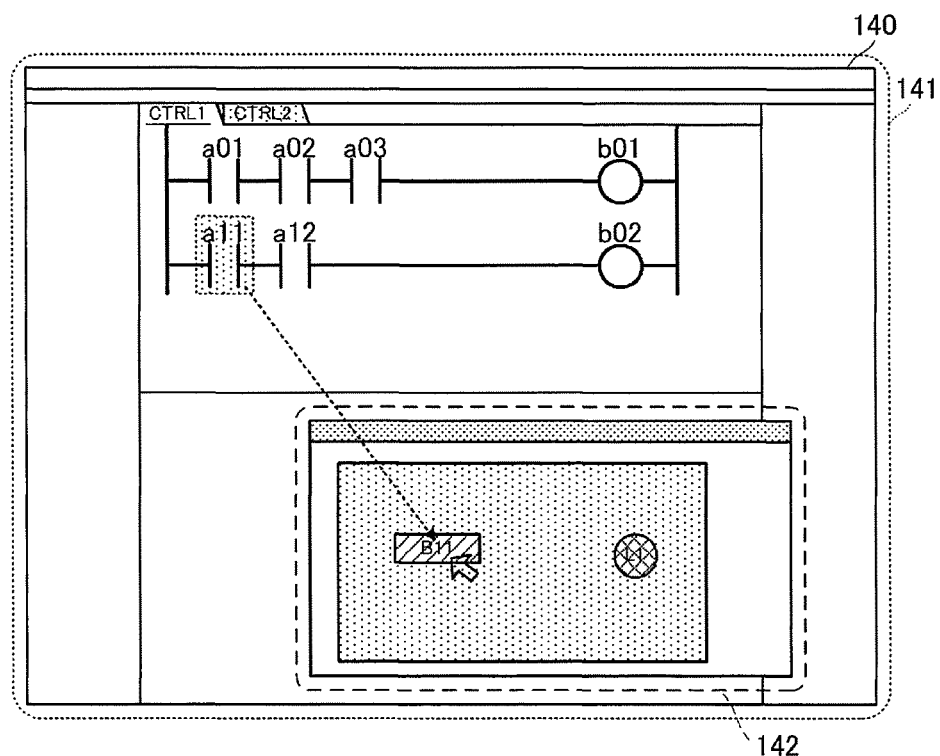

(Embodiment 2) Case of Updating the Variable of the Element of the UI Program from the Ladder Program FIG. 5(A) is a screen diagram showing a drag state of a contact point of the ladder program, and FIG. 5 (B) is a screen diagram showing a drop state of the contact point of the ladder program. Besides, FIG. 5(A) is the same as FIG. 3(A), and FIG. 5(B) is different from FIG. 3(B) only in that an element of the UI program already exists in the drop position. Accordingly, in the process described using FIG. 5(A) and FIG. 5(B), the description of a place in which the process described using FIG. 3(A) and FIG. 3(B) is upset is omitted.

As shown in FIG. 5(A), the contact point is dragged in the ladder program editing area 411 and is dropped in the UI program editing area 142. Here, as shown in FIG. 5(B), the button is already disposed and displayed in the drop position. In this case, the program development support unit 11 directly displays the button, and executes update for only changing the variable of the button. At the same time, the inherent index attached to the button is also changed. Update of the variable mapping of the UI program that shows changes of variables of the button is performed.

(Embodiment 3) Case of Adding an Element of the UI Program from the ST Program

Figure 6A:
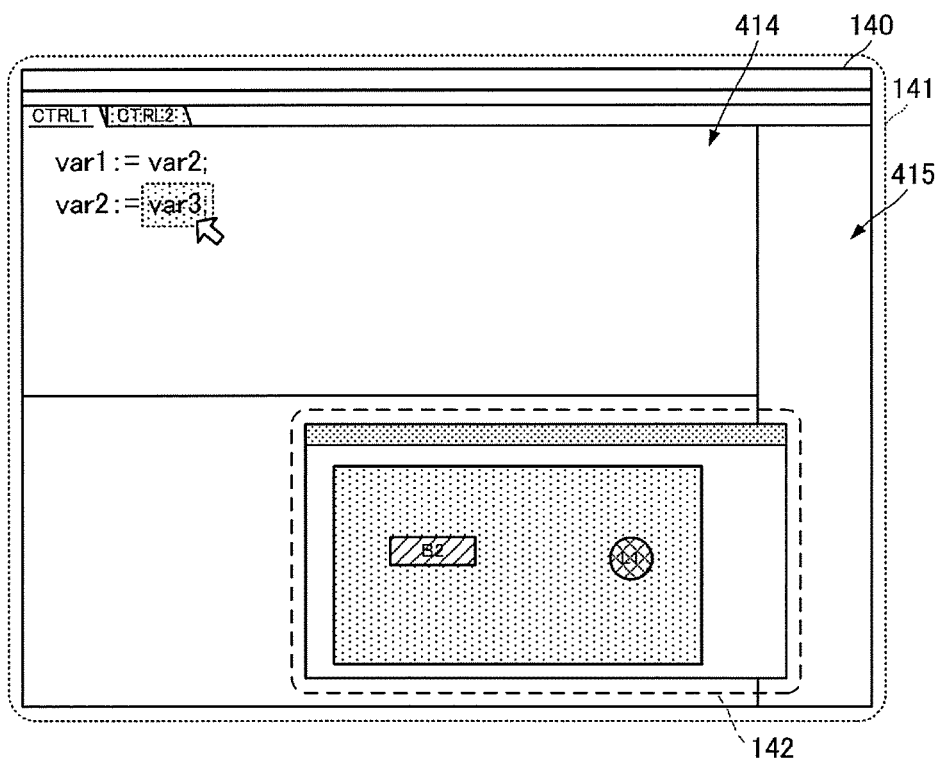
FIG. 6(A) is a screen diagram showing a drag state of a first element of a ST program.
Figure 6B:
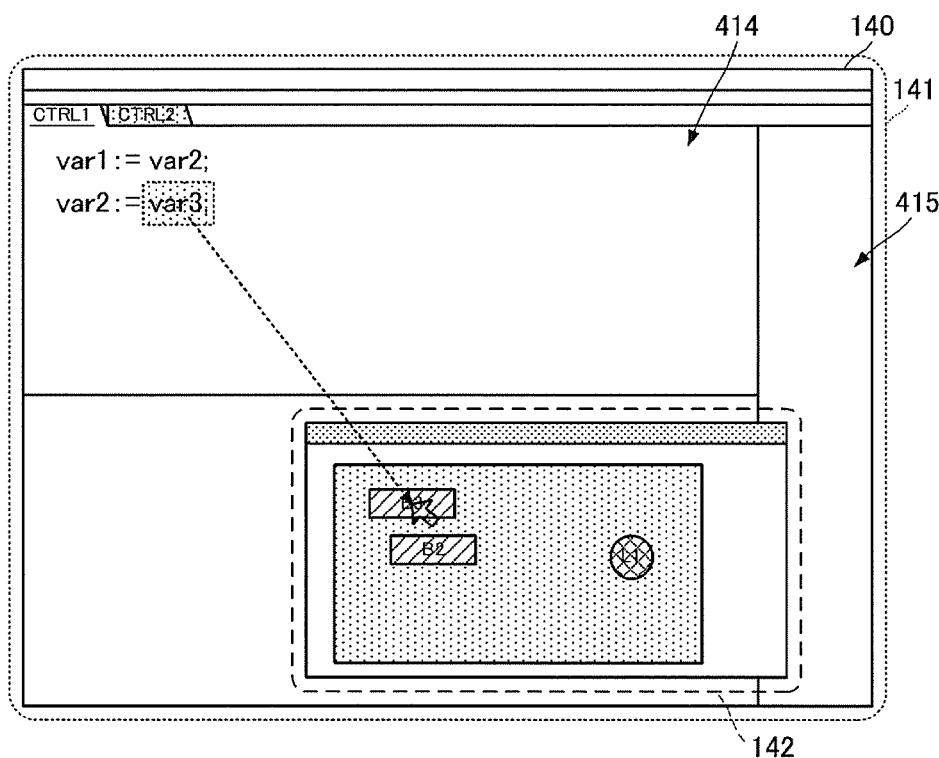
FIG. 6(B) is a screen diagram showing a drop state of the first element of the ST program.
Figure 7A:
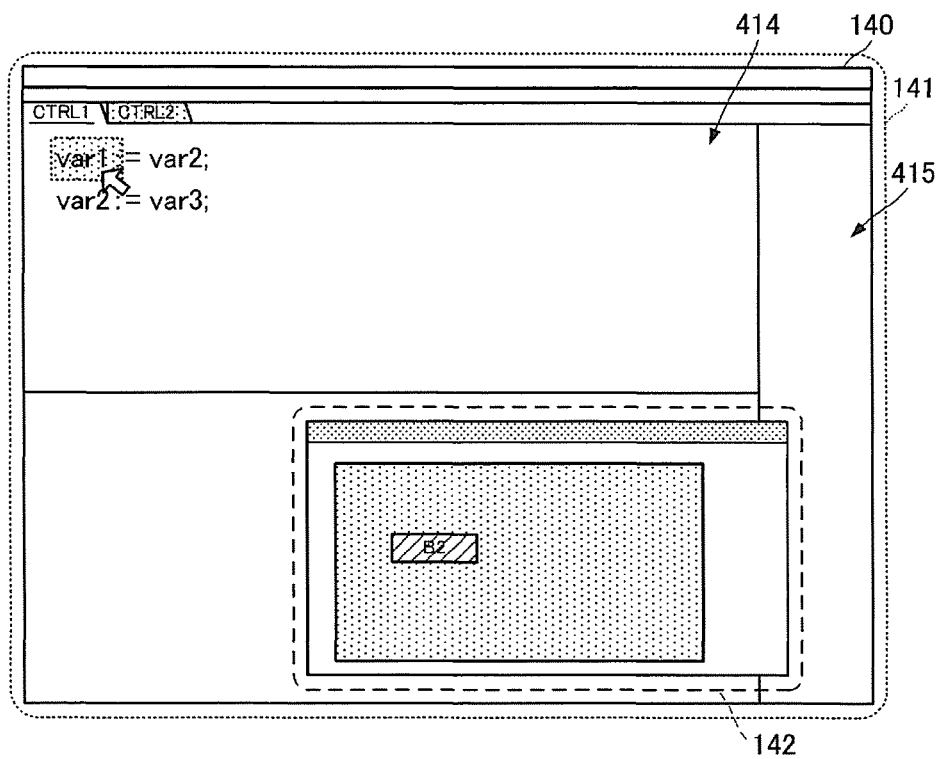
FIG. 7(A) is a screen diagram showing a drag state of a second element of the ST program, and FIG. 7 (B) is a screen diagram showing a drop state of the second element of the ST program.

FIG. 6(A) is a screen diagram showing a drag state of a first element of a ST program, and FIG. 6(B) is a screen diagram showing a drop state of the first element of the ST program. FIG. 7(A) is a screen diagram showing a drag state of a second element of the ST program, and FIG. 7 (B) is a screen diagram showing a drop state of the second element of the ST program.

As shown in FIG. 6(A), FIG. 6(B), FIG. 7(A), and FIG. 7(B), when editing of the ST program and editing of the UI program are performed, at least a ST program editing area (window) 414 and the UI program editing area (window) 142 are displayed on the display screen 140 of the display unit 14.

A formula of the ST program is displayed on the ST program editing area 414, and the UI screen is displayed on the UI program editing area 142.

When the programmer operates the operation input unit 12 such as a mouse or the like, the pointer moves on the display screen 140 in accordance with movement of the mouse. Then, when a display area of the element of the ST program overlaps the pointer, a display mode of the display area of the element of the ST program changes as shown in FIG. 6(A) and FIG. 7(A). When the programmer performs a drag operation in this state, the element of the ST program is selected.

Figure 7B:
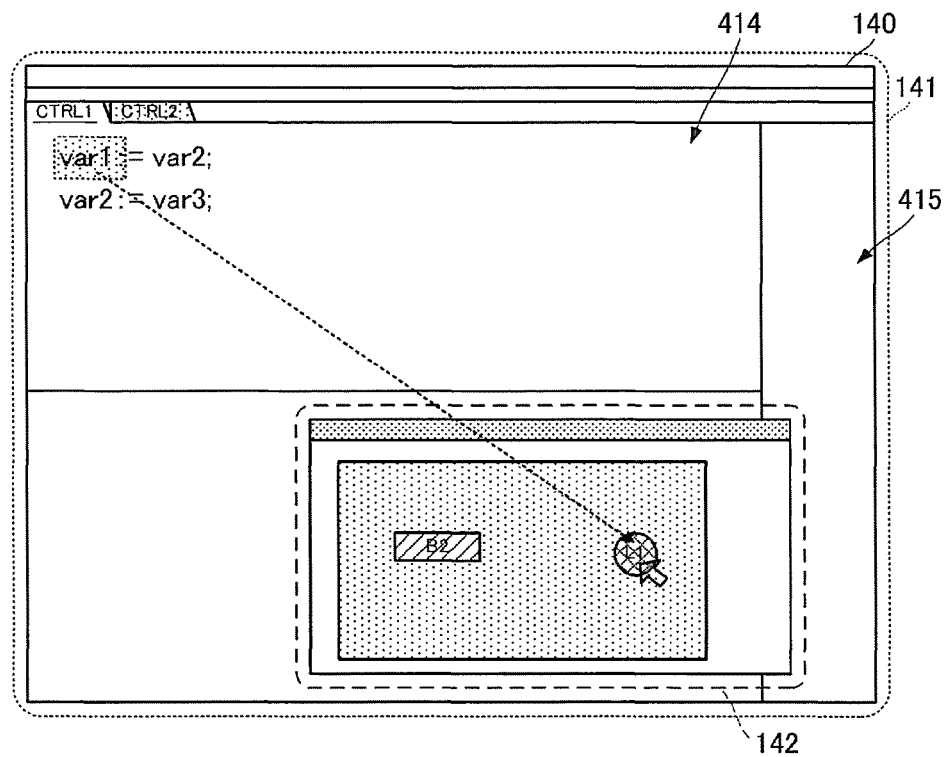

Next, when the programmer maintains the drag operation state and moves the mouse to the UI program editing area 142, the element of the UI program corresponding to the element of the ST program is displayed on the UI program editing area 142 as shown in FIG. 6(B) and FIG. 7(B).

Specifically, the program development support unit 11 stores a relationship between the elements of the ST program and the elements of the UI program in advance. As stored by the program development support unit 11, if the element of the ST program is on the right side of "=", the corresponding element of the UI program is a button; if the element of the ST program is on the left side of "=", the corresponding element of the UI program is a bit lamp.

Accordingly, when the element on the right side of "=" is dragged in the ST program editing area 414 and is dropped in the UI program editing area 142 as shown in FIG. 6(A), the button is disposed and displayed in a specified position of the UI program editing area 142 as shown in FIG. 6(B). At this time, an inherent index may be attached to and displayed on the button. The inherent index refers to a variable name or the like of the element of the ST program corresponding to the button.

At this time, the variable of the corresponding element of the ST program is set on the button. In addition, the button and the variable thereof are added to the variable mapping of the UI program.

In addition, when the element on the left side of "=" is dragged in the ST program editing area 414 and is dropped in the UI program editing area 142 as shown in FIG. 7(A), the bit lamp is disposed and displayed in a specified position of the UI program editing area 142 as shown in FIG. 7(B). At this time, an inherent index is attached to and displayed on the bit lamp. The inherent index refers to a variable name or the like of the element of the ST program corresponding to the button.

At this time, the variable of the corresponding element of the ST program is set on the bit lamp. In addition, the bit lamp and the variable thereof are added to the variable mapping of the UI program.

Besides, although not described in detail here, similar to the element of the ladder program, if an element of the UI program is already disposed in the drop destination with respect to the element of the ST program, update of variables of the element of the UI program is performed.

Figure 8A:
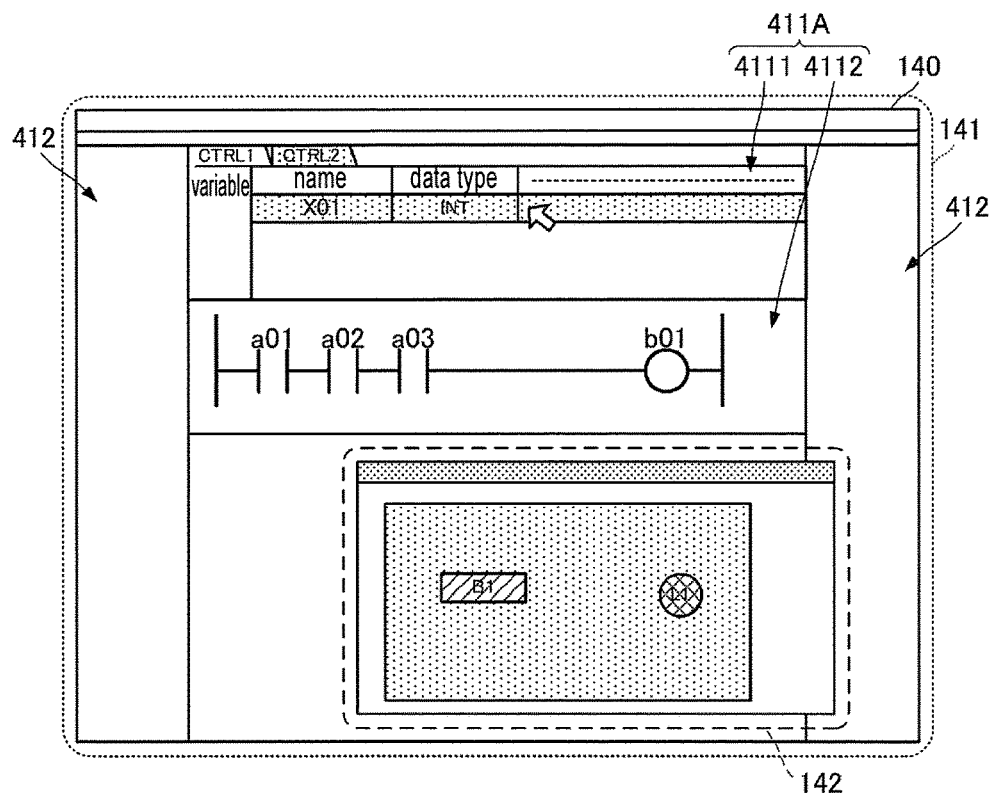
FIG. 8(A) is a screen diagram showing a drag state of a variable of a variable setting program.
Figure 8B:
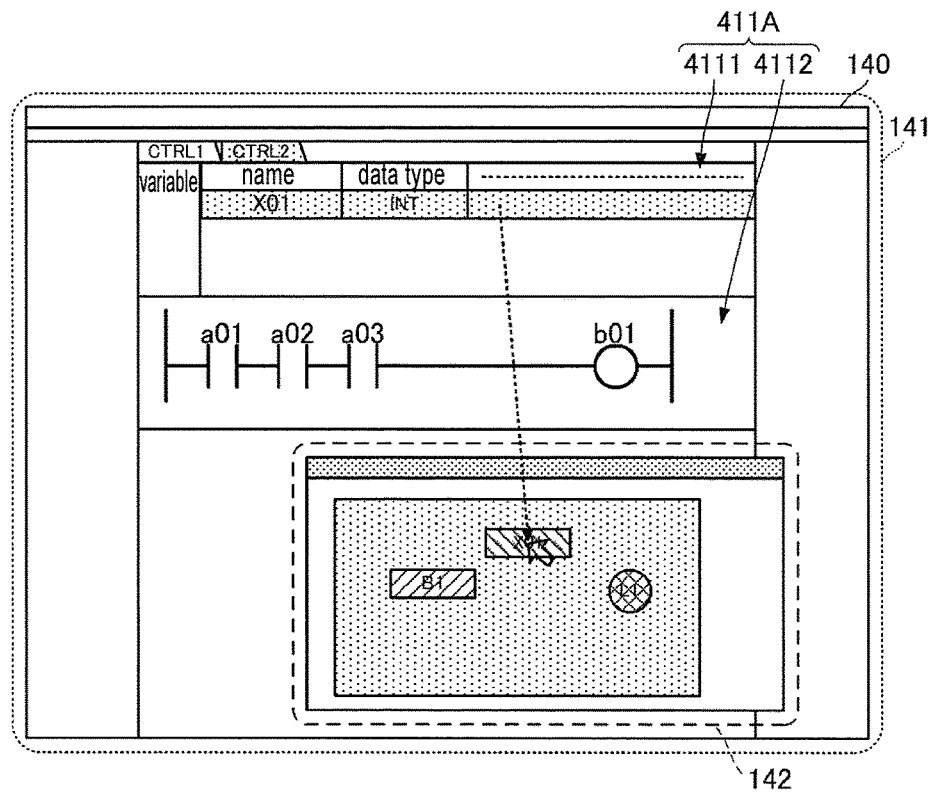
FIG. 8(B) is a screen diagram showing a drop state of a variable of a variable setting editing area.

(Embodiment 4) Case of Adding an Element of the UI Program from the Variable Setting Editing Area FIG. 8(A) is a screen diagram showing a drag state of a variable of a variable setting area, and FIG. 8(B) is a screen diagram showing a drop state of the variable of the variable setting editing area.

As shown in FIG. 8(A), FIG. 8(B), when editing of the variable setting and editing of the UI program are performed, at least a variable setting editing area (window) 4111 and the UI program editing area (window) 142 are displayed on the display screen 140 of the display unit 14. The variable setting editing area 145 corresponds to "setting screen of variable" of the present invention. In addition, the multiview explorer 412, the editing tool box 413 and the like are also displayed on the display screen 140. Furthermore, the ladder program editing area 4112 and the ST program editing area can also be displayed as necessary. The area 411A shown in FIG. 8(A), FIG. 8(B) includes the ladder program editing area 4112 and variable setting editing area 4111 represented by the display screen 140.

A list of variables is displayed on the variable setting editing area 4111. The variable type is set for each variable. The UI screen is displayed on the UI program editing area 142.

When the programmer operates the operation input unit 12 such as a mouse or the like, the pointer moves on the display screen 140 in accordance with movement of the mouse. Then, when a display area of the element (the variable selected within the variables displayed by a list) of the variable setting program overlaps the pointer, a display mode of the display area of the variable of the variable setting program changes as shown in FIG. 8(A). When the programmer performs a drag operation in this state, the variable is selected.

Next, when the programmer maintains the drag operation state and moves the mouse to the UI program editing area 142, the element of the UI program corresponding to the variable is displayed on the UI program editing area 142 as shown in FIG. 8(B). At this time, the variable type is used to set the element of the UI program.

Figures 9, 10:
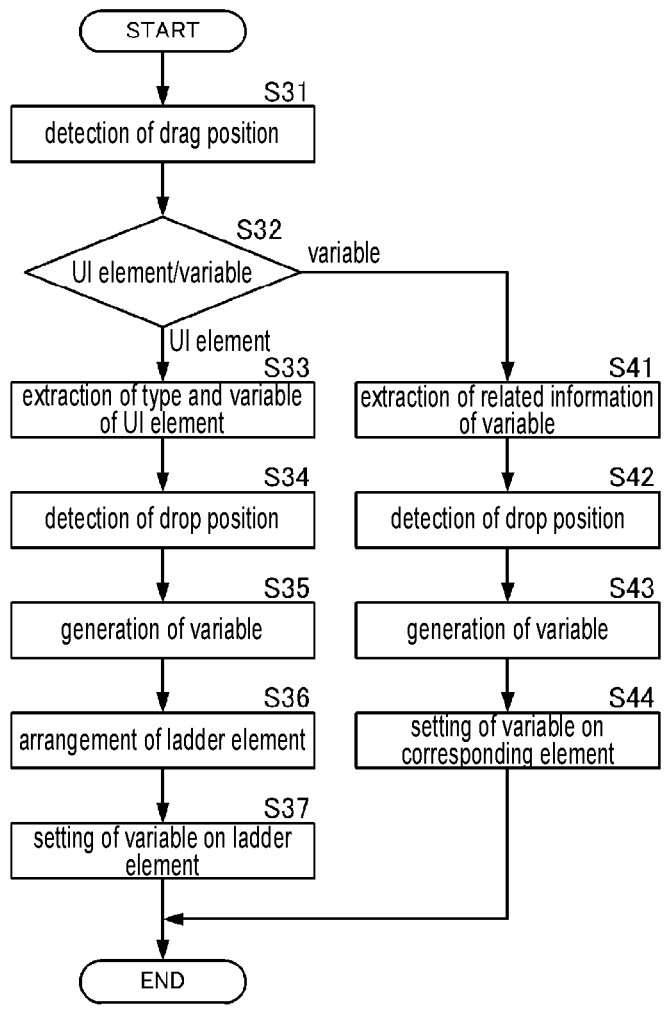
FIG. 9 is a table showing a relationship between variables and elements of a UI program.
FIG. 10 is a flowchart showing the process of the program development support technology of the present invention.

Specifically, the program development support unit 11 stores a relationship between the variable types and the elements of the UI program in advance. FIG. 9 is a table showing the relationship between the variables and the elements of the UI program. As shown in FIG. 9, if the variable type is a BOOL type, the element of the UI program is a bit lamp. If the variable type is an integer type or a real type, the element of the UI program is a right-aligned data display. If the variable type is a STRING type, the element of the UI program is a left-aligned data display. If the variable type is a structure type, the element of the UI program is a display frame of shape and form corresponding to the structure member.

Accordingly, when an INT (integer) type variable is dragged in the variable setting editing area 4111 and is dropped in the UI program editing area 142 as shown in FIG. 8(A), a data display (right-aligned type) is disposed and displayed in a specified position of the UI program editing area 142 as shown in FIG. 8(B). At this time, the variable is added to the variable mapping of the UI program.

Besides, in the above description, the program development support unit 11 sets the elements of the UI program from the elements of the sequence program, but reverse process can also be performed. That is, the program development support unit 11 can set the elements of the sequence program from the elements of the UI program.

Specifically, the program development support unit 11 executes process shown in FIG. 10. FIG. 10 is a flowchart showing the process of the program development support technology of the present invention. Besides, in FIG. 10, an aspect in which the sequence program is the ladder program is shown, but the same process can also be performed on the ST program and the variable setting program.

The program development support unit 11 detects a drag position based on input of the operation input unit 12 (S31), and extracts the type and variable of the dragged element of the UI program (S31-S33). This process is the same as the process of S11 in FIG. 2.

The program development support unit 11 extracts the type and variable of the dragged element of the UI program (S32).

The program development support unit 11 detects a drop position based on input of the operation input unit 12 (S34). Specifically, the program development support unit 11 detects a position within the ladder program editing area 411 that is specified by the operation input unit 12.

The program development support unit 11 generates a variable for the ladder program corresponding to the extracted element of the UI program (S35).

The program development support unit 11 disposes an element (ladder element) of the ladder program corresponding to the extracted element of the UI program in the drop position (S36).

The program development support unit 11 sets a variable for the disposed element of the ladder program (S37). At this time, the program development support unit 11 updates the variable mapping of the ladder program corresponding to the added element of the ladder program.

Figure 11A:
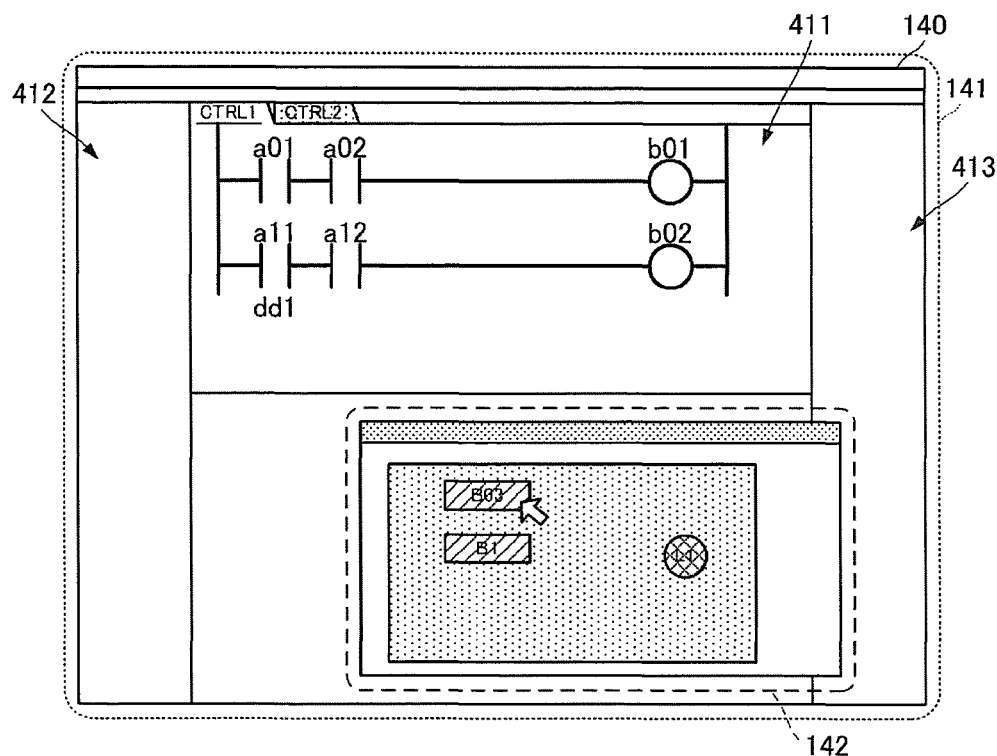
FIG. 11(A) is a screen diagram showing a drag state of a button of the UI program.
Figure 11B:
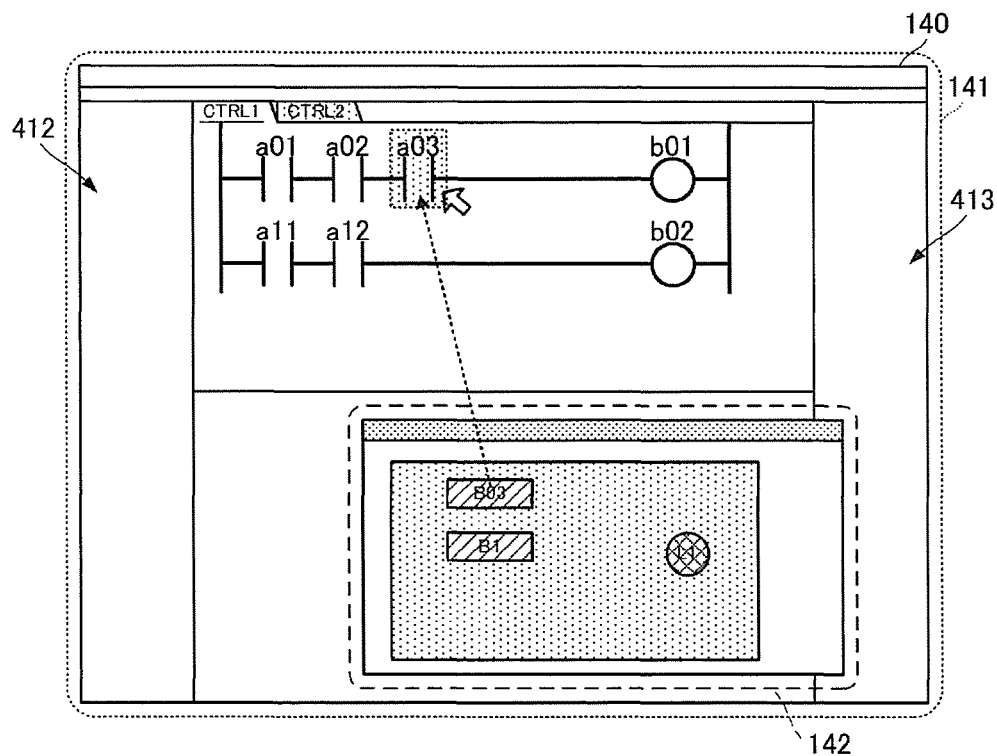
FIG. 11(B) is a screen diagram showing a drop state of the button of the UI program.

FIG. 11(A) is a screen diagram showing a drag state of a button of the UI program, and FIG. 11(B) is a screen diagram showing a drop state of the button of the UI program.

When the programmer operates the operation input unit 12 such as a mouse or the like, the pointer moves on the display screen 140 in accordance with movement of the mouse. Then, when the display area of the element of the UI program overlaps the pointer, the display mode of the display area of the element of the UI program changes. When the programmer performs a drag operation in this state, the element of the ladder program is selected.

Next, when the programmer maintains the drag operation state and moves the mouse to the ladder program editing area 411, the element of the ladder program corresponding to the element of the UI program is displayed on the ladder program editing area 411 as shown in FIG. 11(B).

Accordingly, when the button is dragged in the UI program editing area 142 and is dropped in the ladder program editing area 411 as shown in FIG. 11(A), the contact point is disposed and displayed in a specified position of the ladder program editing area 411 as shown in FIG. 11(B). At this time, an inherent index may be attached to and displayed on the contact point. The inherent index refers to a variable name or the like of the contact point corresponding to the button. In addition, the newly-added contact point is automatically connected to the elements of two adjacent sides of the ladder program.

At this time, the variable of the corresponding button is set on the contact point. In addition, the contact point and the variable thereof are added to the variable mapping of the ladder program.

Besides, overwrite update process can also be applied similarly to the above-described Embodiment 1 in these processes. The program development support 11 executes the processes from S41 to S44 when the elements of the UI program are set from the elements of the sequence program.

Besides, although not described in detail in the above description, the name of a controller in which the sequence program is applied is also utilized as information during drag and drop. For example, in a state that a plurality of controllers is edited in parallel, for example, a state that a controller 1 (CTRL1) and a controller (CTRL2) are edited in parallel as shown in each drawing, the variable mapping is updated so that the editing includes an active controller name (controller 1 (CTRL1) in each drawing). Accordingly, a sequence program and a UI program in which variables are mutually matched can also be easily created even if a plurality of controllers is edited in parallel.

In addition, although a case in which the variable is an array is not described in the above description, when the variable is an array, the elements of the UI program can be displayed by array corresponding to the array number of the elements of the sequence program based on the above process. Accordingly, the sequence program and the UI program can be mutually matched and easily created even for the arrayed variables.

In addition, an aspect in which drag and drop from the sequence program or variable setting to the UI program are performed is shown in the above description, but drag and drop from the UI program to the sequence program can also be performed using the same principle.

In addition, in the above description, an aspect is shown in which the sequence program editing area 141, the UI program editing area 142, and the variable setting editing area 4111 are displayed on the display screen 140 at the same time. However, for example, the above-described process can also be applied to an aspect in which the sequence program editing area 141, the UI program editing area 142, and the variable setting editing area 145 are respectively set in full screen display on the display screen 140 and are switched to be displayed by a tab operation and the like for each area. In this case, for example, it is sufficient to switch the editing area of a current (an editing object) by overlapping the mouse on the tab and execute the drag and drop using the mouse. In addition, the display mode of the sequence program editing area 141, the UI program editing area 142, and the variable setting editing area 145 is not limited hereto, and can be appropriately set using various methods in which a plurality of areas is displayed on the display screen.

What is claimed is:

1. A program development support device, comprising:
    a display configured to display an editing screen of a controller program and an editing screen of a user interface program; and
    a processor, coupled to the display, configured to:
    perform an editing of the controller program;
    perform an editing of the user interface program;
    receive an operation input of selection and movement of an element of the controller program displayed in the editing screen of the controller program; and
    reflect, on the editing screen of the user interface program, an element of the user interface program that correspond to the element of the controller program that is selected and moved from the editing screen of the controller program to the editing screen of the user interface program,
    wherein the processor determines type of the element of the user interface program according to type of the controller program, and
    if the elements of the controller program are global variables and there is no element of the user interface program at a movement destination of the element of the controller program, the processor causes the elements of the user interface program corresponding to the element of the controller program being moved to be newly displayed on the editing screen of the user interface program,
    wherein the processor updates a variable mapping when the element of the controller program is dragged and dropped to a movement destination in the editing screen of the user interface program having the element of the user interface program corresponding to the element of the controller program, and there are elements of the user interface program corresponding to the elements of the controller program at the movement destination,
    wherein the variable mapping represents a relation between each of a plurality of elements of the user interface program and each of a plurality of elements of the controller program,
    wherein the elements of the user interface program are graphical interface indicators for operator to perform settings on a sequence control device, and the elements of the controller program are used to program the operation of the sequence control device,
    wherein the user interface program and controller program are associated by the global variables.

2. The program development support device according to claim 1,
    wherein the processor updates the variable mapping if the elements of the controller program are global variables, and
    the variable mapping is not updated if variables of the elements of the controller program are not global variables.

3. The program development support device according to claim 1,
    wherein the processor detects a data type of the variable of the selected element of the controller program, and determines a display mode of the elements of the user interface program corresponding to the data type of the variable.

4. The program development support device according to claim 1,
    wherein the processor is capable of editing a plurality of controller programs in parallel, and
    detects the selected controller program to perform a variable mapping for the detected controller program.

5. The program development support device according to claim 1,
    wherein the controller program is a ladder program or a ST program.

6. The program development support device according to claim 5, wherein
    when the controller program is an ST program, shapes of elements of the user interface program are determined according to positions of ST elements.

7. A program development support method, comprising:
a controller editing process for performing an editing of a controller program;
a UI editing process for performing an editing of a user interface program;
a display process for displaying an editing screen of the controller program and an editing screen of the user interface program;
an operation input process for receiving an operation input of selection and movement of an element of the controller program displayed in the editing screen of the controller program; and
a copy function process for reflecting, on the editing screen of the user interface program, an element of the user interface program that correspond to the element of the controller program that is selected and moved from the editing screen of the controller program to the editing screen of the user interface program,
wherein in the copy function process,
type of the element of the user interface program is determined according to type of the controller program, and
if the elements of the controller program are global variables and there is no element of the user interface program at a movement destination of the element of the controller program, the program development support method causes the element of the user interface program corresponding to the element of the controller program being moved to be newly displayed on the editing screen of the user interface program,
wherein a variable mapping is updated when the element of the controller program is dragged and dropped to a movement destination in the editing screen of the user interface program having the element of the user interface program corresponding to the element of the controller program, and there are elements of the user interface program corresponding to the elements of the controller program at the movement destination,
wherein the variable mapping represents a relation between each of a plurality of elements of the user interface program and each of a plurality of elements of the controller program,
wherein the elements of the user interface program are graphical interface indicators for operator to perform settings on a sequence control device, and the elements of the controller program are used to program the operation of the sequence control device, wherein the user interface program and controller program are associated by the global variables.

8. A non-transitory storage unit storing a program development support program, the program development support program causing an information processing device to execute:
a controller editing process for performing an editing of a controller program;
a UI editing process for performing an editing of a user interface program;
a display process for displaying an editing screen of the controller program and an editing screen of the user interface program;
an operation input process for receiving an operation input of selection and movement of an element of the controller program displayed in the editing screen of the controller program display process; and
a copy function process for reflecting, on the editing screen of the user interface program, an element of the user interface program that correspond to an element of the controller program that is selected and moved from the editing screen of the controller program to the editing screen of the user interface program,
wherein in the copy function process,
the information processing device is caused to determine type of the element of the user interface program according to type of the controller program, and
if the elements of the controller program are global variables and there is no element of the user interface program at a movement destination of the element of the controller program, the information processing device causes the element of the user interface program corresponding to the element of the controller program being moved to be newly displayed on the editing screen of the user interface program,
wherein a variable mapping is updated when the element of the controller program is dragged and dropped to a movement destination in the editing screen of the user interface program having the element of the user interface program corresponding to the element of the controller program, and there are elements of the user interface program corresponding to the elements of the controller program at the movement destination,
wherein the variable mapping represents a relation between each of a plurality of elements of the user interface program and each of a plurality of elements of the controller program,
wherein the elements of the user interface program are graphical interface indicators for operator to perform settings on a sequence control device, and the elements of the controller program are used to program the operation of the sequence control device, wherein the user interface program and controller program are associated by the global variables.

* * * * *